US010467128B2

(12) United States Patent
Conti et al.

(10) Patent No.: US 10,467,128 B2
(45) Date of Patent: Nov. 5, 2019

(54) MEASURING AND OPTIMIZING TEST RESOURCES AND TEST COVERAGE EFFECTIVENESS THROUGH RUN TIME CUSTOMER PROFILING AND ANALYTICS

(71) Applicant: International Business Machines Corporation, Armonk, NY (US)

(72) Inventors: Thomas W. Conti, Poughkeepsie, NY (US); Kyle R. Moser, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 138 days.

(21) Appl. No.: 15/259,099

(22) Filed: Sep. 8, 2016

(65) Prior Publication Data
US 2018/0067843 A1   Mar. 8, 2018

(51) Int. Cl.
*G06F 11/00*   (2006.01)
*G06F 11/36*   (2006.01)

(52) U.S. Cl.
CPC ...... *G06F 11/3676* (2013.01); *G06F 11/3688* (2013.01)

(58) Field of Classification Search
CPC ............. G06F 11/3676; G06F 11/3672; G06F 11/3688
See application file for complete search history.

(56) References Cited

U.S. PATENT DOCUMENTS

| | | | |
|---|---|---|---|
| 5,881,238 A | 3/1999 | Aman et al. | |
| 6,167,427 A | 12/2000 | Rabinovich et al. | |
| 6,351,775 B1 | 2/2002 | Yu | |
| 6,981,180 B1 | 12/2005 | Bailey et al. | |
| 7,003,504 B1 | 2/2006 | Angus et al. | |
| 7,080,378 B1 | 7/2006 | Noland et al. | |

(Continued)

FOREIGN PATENT DOCUMENTS

WO   2013088453 A2   6/2013

OTHER PUBLICATIONS

List of IBM Patents or Patent Applications Treated As Related (Appendix P), Filed Feb. 27, 2017, 2 pages.

(Continued)

*Primary Examiner* — Philip Guyton
(74) *Attorney, Agent, or Firm* — Cantor Colburn LLP; William Kinnaman (57) ABSTRACT

Aspects of the present invention include a method, system and computer program product. The method includes a processor performing an accounting of available test resources within one or more organizations; storing data relating to the accounting of available test resources; storing data relating to one or more test resource goals; determining to maintain the data relating to the accounting of available test resources; determining to analyze the data relating to the accounting of available test resources; analyzing the data relating to the accounting of available test resources with respect to the data relating to one or more test resource goals; and determining from the analyzing, by the processor, the data relating to the accounting of available test resources with respect to the data relating to one or more test resource goals that the available test resources within one or more organizations are either optimal or non-optimal.

13 Claims, 5 Drawing Sheets

(56) References Cited

U.S. PATENT DOCUMENTS

| | | | |
|---|---|---|---|
| 7,475,157 B1 | 1/2009 | Tormasov | |
| 7,561,988 B2 | 7/2009 | Matsunaga et al. | |
| 7,720,955 B1 | 5/2010 | Kelly et al. | |
| 7,860,097 B1 | 12/2010 | Lovett et al. | |
| 8,024,615 B2 | 9/2011 | Tarta | |
| 8,417,715 B1 | 4/2013 | Bruckhaus et al. | |
| 8,781,977 B1 | 7/2014 | Huberman et al. | |
| 8,850,270 B2 | 9/2014 | Heiper et al. | |
| 9,317,407 B2 | 4/2016 | Sabin et al. | |
| 9,727,448 B1* | 8/2017 | Seibert, Jr. | G06F 11/368 |
| 9,846,881 B2 | 12/2017 | Greene et al. | |
| 10,019,167 B2 | 7/2018 | Gray | |
| 2001/0012986 A1* | 8/2001 | Conan | G06F 11/3688 702/188 |
| 2001/0013008 A1 | 8/2001 | Waclawski | |
| 2002/0156663 A1 | 10/2002 | Weber et al. | |
| 2002/0170022 A1 | 11/2002 | Shirai et al. | |
| 2004/0044744 A1 | 3/2004 | Grosner et al. | |
| 2005/0076043 A1 | 4/2005 | Benedetti et al. | |
| 2005/0137819 A1* | 6/2005 | Lam | G06F 11/3672 702/119 |
| 2005/0187990 A1 | 8/2005 | Pace | |
| 2006/0095311 A1 | 5/2006 | Thompson | |
| 2007/0022426 A1 | 1/2007 | Steinder et al. | |
| 2007/0083793 A1* | 4/2007 | Roth | G06F 11/3414 714/25 |
| 2007/0094542 A1* | 4/2007 | Bartucca | G06F 11/3672 714/38.1 |
| 2007/0276871 A1 | 11/2007 | Fu et al. | |
| 2008/0028409 A1 | 1/2008 | Cherkasova | |
| 2008/0189350 A1 | 8/2008 | Vasa et al. | |
| 2009/0199047 A1* | 8/2009 | Vaitheeswaran | G06F 11/3409 714/47.2 |
| 2010/0070230 A1* | 3/2010 | Kumar | G06F 11/263 702/119 |
| 2012/0017195 A1* | 1/2012 | Kaulgud | G06F 11/3692 717/101 |
| 2012/0095956 A1 | 4/2012 | Xiong et al. | |
| 2012/0110589 A1 | 5/2012 | Ghosh et al. | |
| 2012/0131104 A1 | 5/2012 | Beaven et al. | |
| 2013/0007126 A1 | 1/2013 | Ziemann | |
| 2013/0073473 A1 | 3/2013 | Heath | |
| 2013/0162444 A1 | 6/2013 | Boulanger et al. | |
| 2013/0185021 A1 | 7/2013 | Addison et al. | |
| 2013/0212264 A1 | 8/2013 | Troppens et al. | |
| 2014/0033055 A1 | 1/2014 | Gardner et al. | |
| 2014/0109002 A1 | 4/2014 | Kimball | |
| 2014/0337429 A1 | 11/2014 | Asenjo et al. | |
| 2014/0344787 A1 | 11/2014 | Cochrane et al. | |
| 2015/0032691 A1 | 1/2015 | Hall et al. | |
| 2015/0046363 A1 | 2/2015 | McNamara et al. | |
| 2015/0113162 A1 | 4/2015 | Chan et al. | |
| 2015/0229582 A1 | 8/2015 | Zhu et al. | |
| 2015/0317337 A1 | 11/2015 | Edgar | |
| 2015/0363348 A1 | 12/2015 | Haynes | |
| 2016/0188370 A1 | 6/2016 | Razin et al. | |
| 2016/0224392 A1 | 8/2016 | Clarke et al. | |
| 2016/0231999 A1 | 8/2016 | Holler et al. | |
| 2017/0250885 A1* | 8/2017 | Donovan | H04L 67/22 |
| 2018/0067843 A1* | 3/2018 | Conti | G06F 11/3688 |
| 2018/0067844 A1* | 3/2018 | Conti | G06F 11/3688 |
| 2018/0284756 A1 | 10/2018 | Cella et al. | |

OTHER PUBLICATIONS

Thomas R. Brown, et al., Pending U.S. Appl. No. 15/424,971 Entitled "Run Time Workload Threshold Alerts for Customer Profiling Visualization" Filed with the USPTO Feb. 6, 2017.

Thomas R. Brown, et al., Pending U.S. Appl. No. 15/427,129 Entitled "Run Time and Historical Workload Report Scores for Customer Profiling Visualization" Filed with the USPTO Feb. 8, 2017.

Thomas W. Conti, et al., Pending U.S. Appl. No. 15/424,965 Entitled "Using Customer Profiling and Analytics to Understand Customer Environment and Workload Complexity and Characteristics by Industry" Filed with the USPTO Feb. 6, 2017.

Thomas W. Conti, et al., Pending U.S. Appl. No. 15/424,973 Entitled "Run Time Test Workload Customer Profiling Baselines Visualization" Filed with the USPTO Feb. 6, 2017.

Thomas W. Conti, et al., Pending U.S. Appl. No. 15/427,130 Entitled "Visual Test Workload Execution Modeling" Filed with the USPTO Feb. 8, 2017.

Thomas W. Conti, et al., Pending U.S. Appl. No. 15/427,135 Entitled "Run Time Automatic Workload Tuning Using Customer Profiling Workload Comparison" Filed Feb. 8, 2017.

Thomas W. Conti, et al., Pending U.S. Appl. No. 15/427,137 Entitled "Using Test Workload Run Facts and Problem Discovery Data as Input for Business Analytics to Determine Test Effectiveness" Filed Feb. 8, 2017.

Thomas W. Conti, et al., Pending U.S. Appl. No. 15/429,262 Entitled "Measuring and Optimizing Test Resources and Test Coverage Effectiveness Through Run Time Customer Profiling and Analytics" Filed with the USPTO Feb. 10, 2017.

Thomas W. Conti, et al., Pending U.S. Appl. No. 15/429,265 Entitled "Using Run Time and Historical Customer Profiling and Analytics to Determine Customer Disaster Recovery vs Production Differences, and to Enhance Customer Disaster Recovery Readiness and Effectiveness" Filed with the USPTO Feb. 10, 2017.

Thomas W. Conti, et al., Pending U.S. Appl. No. 15/429,268 Entitled "Using Workload Profiling and Analytics and Score Complexity of Test Environments and Workloads" Filed with the USPTO Feb. 10, 2017.

List of IBM Patents or Patent Applications Treated as Related (Appendix P), Filed Oct. 10, 2016, 2 pages.

Thomas R. Brown, et al., Pending U.S. Appl. No. 15/197,826 Entitled "Run Time Workload Threshold Alerts for Customer Profiling Visualization" Filed with the USPTO Jun. 30, 2016.

Thomas R. Brown, et al., Pending U.S. Appl. No. 15/197,828 Entitled "Run Time and Historical Workload Report Scores for Customer Profiling Visualization" Filed with the USPTO Jun. 30, 2016.

Thomas R. Brown, et al., Pending U.S. Appl. No. 15/197,835 Entitled "Z/OS SMF/RMF Workload Data Playback with Web Dashboard Visualization" Filed with the USPTO Jun. 30, 2016.

Thomas R. Brown, et al., Pending U.S. Appl. No. 15/264,269 Entitled "Using Customer Profiling and Analytics to Create a Relative, Targeted, and Impactful Customer Profiling Environment/Workload Questionnaire" Filed with the USPTO Sep. 14, 2016.

Thomas W. Conti, et al., Pending U.S. Appl. No. 15/197,827 Entitled "Run Time Test Workload Customer Profiling Baselines Visualization" Filed with the USPTO Jun. 30, 2016.

Thomas W. Conti, et al., Pending U.S. Appl. No. 15/197,829 Entitled "Run Time Automatic Workload Tuning Using Customer Profiling Workload Comparison" Filed Jun. 30, 2016.

Thomas W. Conti, et al., Pending U.S. Appl. No. 15/197,831 Entitled "Using Test Workload Run Facts and Problem Discovery Data as Input for Business Analytics to Determine Test Effectiveness" Filed Jun. 30, 2016.

Thomas W. Conti, et al., Pending U.S. Appl. No. 15/197,833 Entitled "Run Time TPNS Workload Controls for Test Workload Tuning in Relation to Customer Profiling Workload" Filed Jun. 30, 2016.

Thomas W. Conti, et al., Pending U.S. Appl. No. 15/197,843 Entitled "Visual Test Workload Execution Modeling" Filed with the USPTO Jun. 30, 2016.

Thomas W. Conti, et al., Pending U.S. Appl. No. 15/197,844 Entitled "Run Time SMF/RMF Statistical Formula Methodology for Generating Enhanced Workload Data Points for Customer Profiling Visulization" Filed Jun. 30, 2016.

Thomas W. Conti, et al., Pending U.S. Appl. No. 15/259,094 Entitled "Z/OS SMF Record Navigation Visualization Tooling" Filed with the USPTO Sep. 8, 2016.

(56) References Cited

OTHER PUBLICATIONS

Thomas W. Conti, et al., Pending U.S. Appl. No. 15/259,104 Entitled "Using Customer Profiling and Analytics to Understand, Rank, Score, and Visualize Best Practices" Filed with the USPTO Sep. 14, 2016.

Thomas W. Conti, et al., Pending U.S. Appl. No. 15/259,107 Entitled "Using Best Practices Customer Adoption Business Intellegence Data as Input to Enterprise Resource Planning (ERP)" Filed with the USPTO Sep. 8, 2016.

Thomas W. Conti, et al., Pending U.S. Appl. No. 15/259,110 Entitled "Using Run Time and Historical Customer Profiling and Analytics to Determine Customer Test vs. Production Differences, and to Enhance Customer Test Effectiveness" Filed with the USPTO Sep. 8, 2016.

Thomas W. Conti, et al., Pending U.S. Appl. No. 15/259,115 Entitled "Using Run Time and Historical Customer Profiling and Analytics to Determine Customer Disaster Recovery vs Production Differences, and to Enhance Customer Disaster Recovery Readiness and Effectiveness" Filed with the USPTO Sep. 8, 2016.

Thomas W. Conti, et al., Pending U.S. Appl. No. 15/259,120 Entitled "Determining If Customer Characteristics by Customer Gography, Country, Culture or Industry May Be Further Applicable to a Wider Customer Set" Filed with the USPTO Sep. 8, 2016.

Thomas W. Conti, et al., Pending U.S. Appl. No. 15/259,122 Entitled "Using Customer and Workload Profiling and Analytics to Determine Score, and Report Portability of Customer and Test Environments and Workloads" Filed with the USPTO Sep. 8, 2016.

Thomas W. Conti, et al., Pending U.S. Appl. No. 15/259,124 Entitled "Using Customer Profiling and Analytics to Understand Customer Workload Complexity and Characteristics by Customer Geography, Country, and Cuture" Filed with the USPTO Sep. 8, 2016.

Thomas W. Conti, et al., Pending U.S. Appl. No. 15/259,130 Entitled "Using Workload Profiling and Analytics and Score Complexity of Test Environments and Workloads" Filed with the USPTO Sep. 8, 2016.

Thomas W. Conti, et al., Pending U.S. Appl. No. 15/259,168 Entitled "Using Customer Profiling and Analytics to Understand Customer Environment and Workload Complexity and Characteristics by Industry" Filed with the USPTO Sep. 8, 2016.

Thomas W. Conti, et al., Pending U.S. Appl. No. 15/264,630 Entitled "Using Customer Workload Profiling and Analytics to Understand and Visualize Customer Workload Execution" Filed with the USPTO Sep. 14, 2016.

Thomas W. Conti, et al., Pending U.S. Appl. No. 15/264,631 Entitled "Using Run Time and Historical Custome Profiling and Analytics to Iteratively Design, Develop, Test, Tune, and Maintain a Customer-Like Test Workload" Filed with the USPTO Sep. 14, 2016.

Thomas W. Conti, et al., Pending U.S. Appl. No. 15/264,632 Entitled "Using Customer Profiling and Analytics to More Accurately Estimate and Generate and Agile Bill of Requirements and Sprints for Customer or Test Workload Port" Filed with the USPTO Sep. 14, 2016.

Thomas W. Conti, et al., Pending U.S. Appl. No. 15/264,634 Entitled "Standardizing Run-Time and Historical Customer and Test Environments and Workloads Comparisons Using Specific Sets of Key Platform Data Points" Filed with the USPTO Sep. 14, 2016.

Thomas W. Conti, et al., Pending U.S. Appl. No. 15/264,638 Entitled "Using Run-Time and Historical Custome Profiling and Analytics to Determine and Score Customer Adoption Levels of Platform Technologies" Filed with the USPTO Sep. 14, 2016.

Thomas W. Conti, et al., Pending U.S. Appl. No. 15/264,639 Entitled "Standardizing Customer and Test Data and Information Collection for Runtime and Historical Profiling Environments and Workload Comparisons" Filed with the USPTO Sep. 14, 2016.

Dias, "Make the Azure Portal Dashboard your own", Nov. 30, 2015, 7 pages.

Yu, "Understanding User Behavior in Large-Scale Video-on-Demand Systems," Apr. 2006, ACM, pp. 333-344.

* cited by examiner

MEASURING AND OPTIMIZING TEST RESOURCES AND TEST COVERAGE EFFECTIVENESS THROUGH RUN TIME CUSTOMER PROFILING AND ANALYTICS

BACKGROUND

The present invention relates to the testing of software, hardware, firmware, and/or other disciplines, and more specifically, to a method, system and computer program product that implement aspects of workload and operational profiling, coupled with business analytics, thereby resulting in improvements in the testing of customer software.

In the field of software testing, as in many other technical fields, improvements are constantly being sought, primarily for cost and accuracy reasons. A fundamental goal of software testing, in theory, is to identify all of the problems in a customer's software program before the program is released for use by the customer. However, in reality, this is far from the case as typically a software program is released to the customer having some number of problems that were unidentified during the software development and testing process.

A relatively more proactive approach to improving software testing is sought that employs traditional methods of understanding characteristics of clients' environments, augmented with a process of data mining empirical systems data. Such client environment and workload profiling analysis may result in software test improvements based on characteristics comparisons between the client and the test environments.

SUMMARY

According to one or more embodiments of the present invention, a computer-implemented method includes performing, by a processor, an accounting of available test resources within one or more organizations; storing, by the processor, data relating to the accounting of available test resources; and storing, by the processor, data relating to one or more test resource goals. The method also includes determining, by the processor, to maintain the data relating to the accounting of available test resources; and determining, by the processor, to analyze the data relating to the accounting of available test resources. The method further includes analyzing, by the processor, the data relating to the accounting of available test resources with respect to the data relating to one or more test resource goals; and determining, by the processor, from the analyzing, by the processor, the data relating to the accounting of available test resources with respect to the data relating to one or more test resource goals that the available test resources within one or more organizations are either optimal or non-optimal.

According to another embodiment of the present invention, a system includes a processor in communication with one or more types of memory, the processor configured to perform an accounting of available test resources within one or more organizations; to store data relating to the accounting of available test resources; and to store data relating to one or more test resource goals. The processor is also configured to determine to maintain the data relating to the accounting of available test resources, and to determine to analyze the data relating to the accounting of available test resources. The processor is further configured to analyze the data relating to the accounting of available test resources with respect to the data relating to one or more test resource goals, and to determine, from the processor configured to analyze the data relating to the accounting of available test resources with respect to the data relating to one or more test resource goals, that the available test resources within one or more organizations are either optimal or non-optimal.

According to yet another embodiment of the present invention, a computer program product includes a non-transitory storage medium readable by a processing circuit and storing instructions for execution by the processing circuit for performing a method that includes performing, by a processor, an accounting of available test resources within one or more organizations; storing, by the processor, data relating to the accounting of available test resources; and storing, by the processor, data relating to one or more test resource goals. The method also includes determining, by the processor, to maintain the data relating to the accounting of available test resources; and determining, by the processor, to analyze the data relating to the accounting of available test resources. The method is further configured to analyzing, by the processor, the data relating to the accounting of available test resources with respect to the data relating to one or more test resource goals; and determining, by the processor, from the analyzing, by the processor, the data relating to the accounting of available test resources with respect to the data relating to one or more test resource goals that the available test resources within one or more organizations are either optimal or non-optimal.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
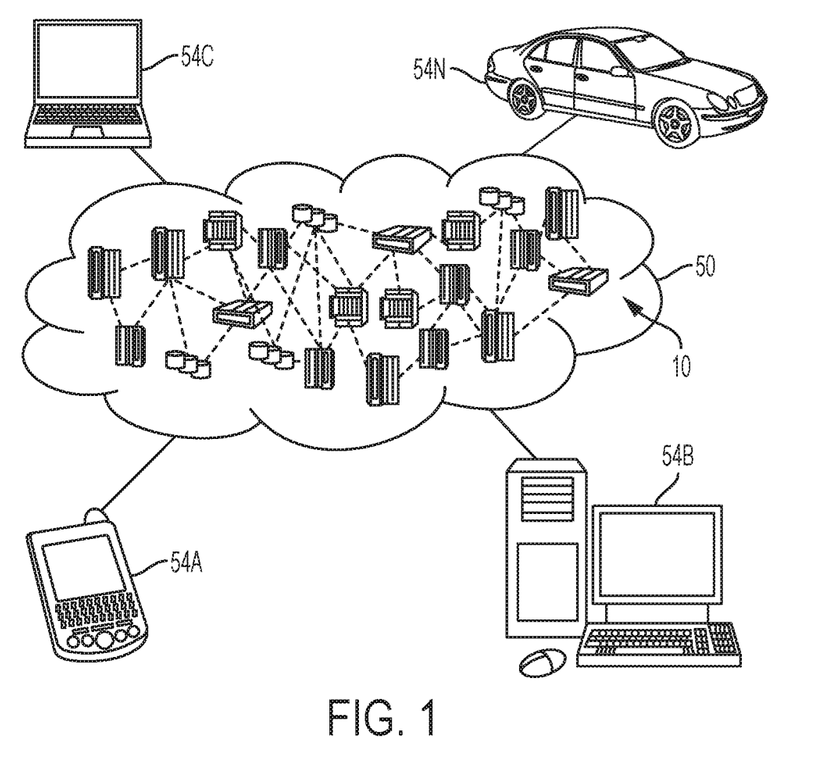
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
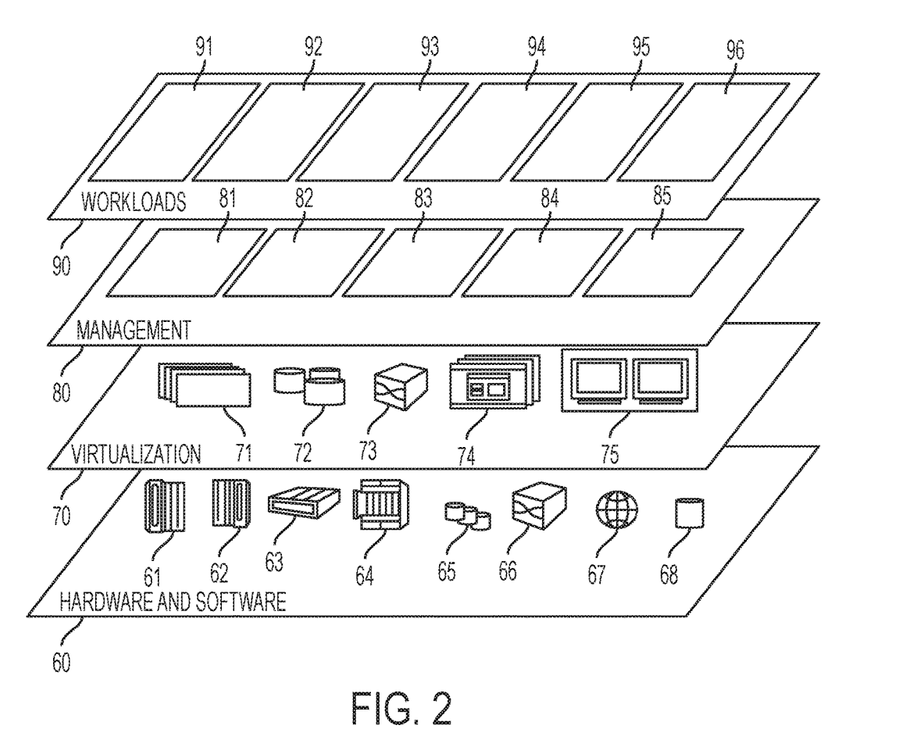
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for measuring and optimizing test resources and test coverage effectiveness through run time customer profiling and analytics in accordance with one or more embodiments of the present invention.

Figure 3:
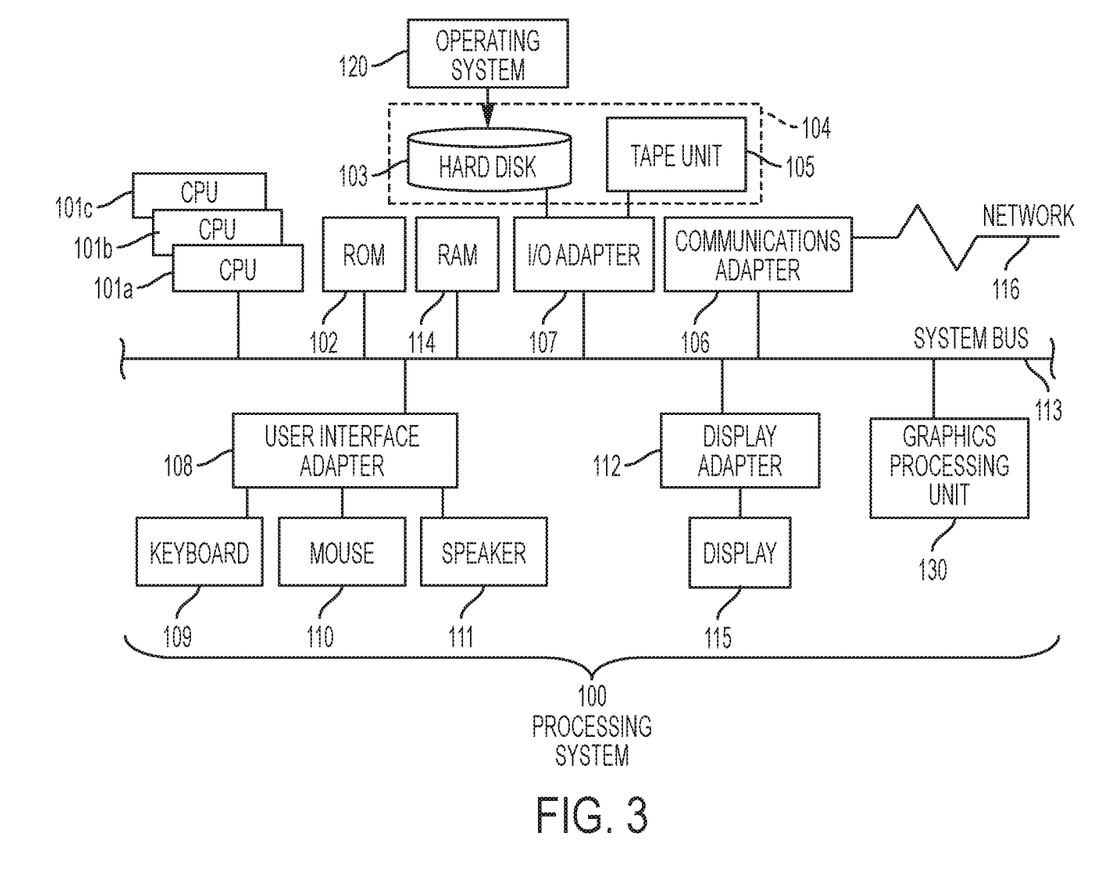
FIG. 3 is a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

In accordance with one or more embodiments of the present invention, methods, systems, and computer program products are disclosed for measuring and optimizing test resources and test coverage effectiveness through run time customer profiling and analytics.

One or more embodiments of the present invention provide for measurement of test resources and coverage efficiency through multiple factors and metrics, using customer profiling and analytics.

Figure 4:
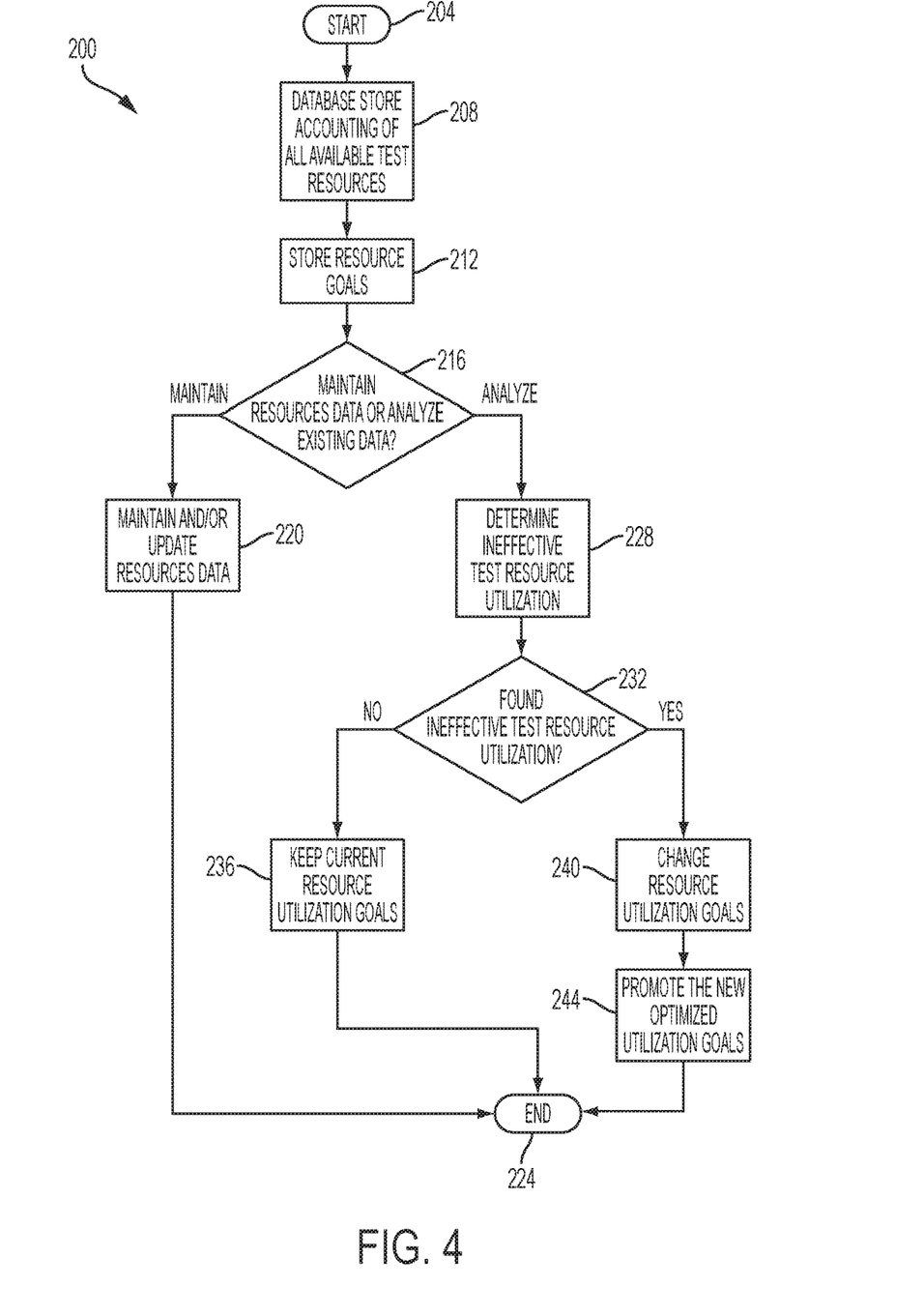
FIG. 4 is a flow diagram of a method for measuring and optimizing test resources and test coverage effectiveness through run time customer profiling and analytics, in accordance with one or more embodiments of the present invention.

With reference now to FIG. 4, a flow diagram illustrates a method 200 according to one or more embodiments of the present invention for measuring and optimizing test resources and test coverage effectiveness through run time customer profiling and analytics.

In one or more embodiments of the present invention, the method 200 may be embodied in software that is executed by computer elements located within a network that may reside in the cloud, such as the cloud computing environment 50 described hereinabove and illustrated in FIGS. 1 and 2. In other embodiments, the computer elements may reside on a computer system or processing system, such as the processing system 100 described hereinabove and illustrated in FIG. 3, or in some other type of computing or processing environment.

After a start operation in block 204, an operation in block 208 takes or performs an accounting of available test resources across or within test organizations, test environments and configurations in those organizations (e.g., within an enterprise), the physical and human resources and their corresponding skills, any limitations or enablement's by geographies, cultures, and time zones, and relationship related resources found in business partners, OEMs, and Open Source Foundations. The data is then stored in a relational database 510 (FIG. 5) as a preparation or prerequisite for analytics processing. This accounting may also be dynamically updated as the test resources of the enterprise change.

Figure 5:
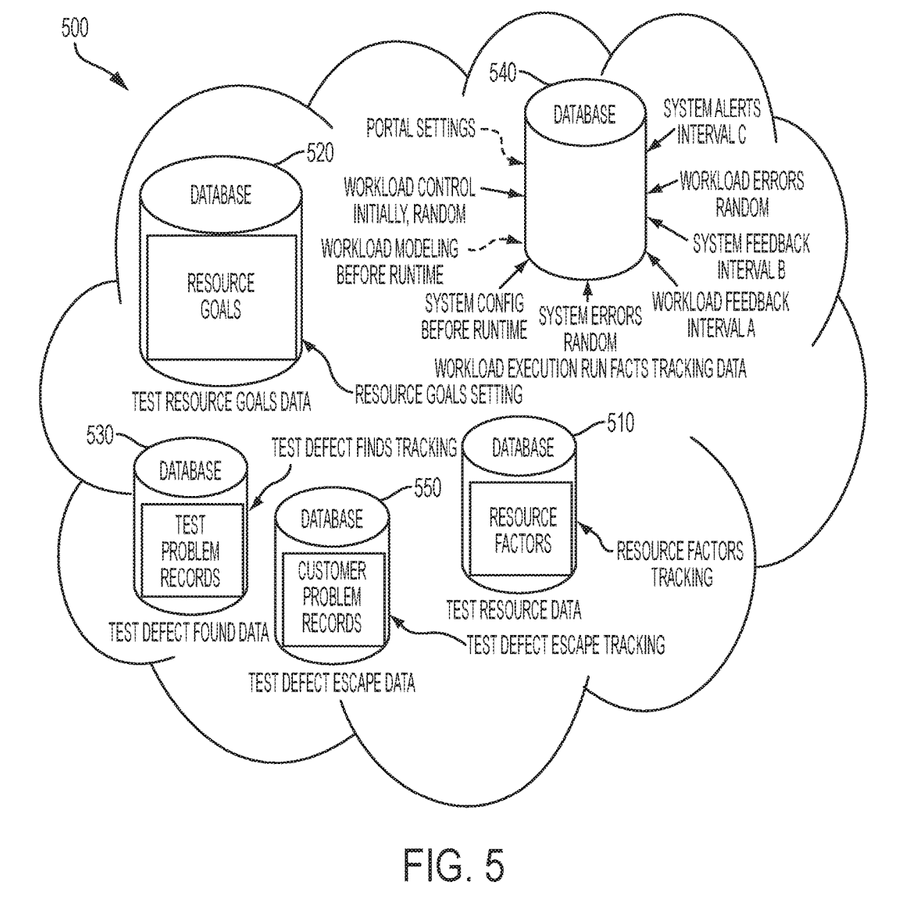
FIG. 5 is a diagram of various databases residing in a cloud computing environment in accordance with one or more embodiments of the present invention.

Referring also to FIG. 5, in embodiments of the present invention, the test resource database 510 may be one of a plurality of databases, or a portion of a single database, that reside within a cloud environment 500, which may be similar in various aspects to the cloud computing environment 50 of FIG. 1. The test resource database 510 may contain data points related, for example, to the tracking of resource allocation and usage of test environments and configurations, test plans, test architectures, test workloads, test cases, test scenarios, test skills, test planners, test architects, testers, business partners, OEMs, and open source foundations.

In an operation in block 212, the resource goals at the enterprise, organization, environment level are stored in a relational database 520. This ties test hardware and software expense, test workload and test case development and maintenance, and human resource and associated skills, including limitations from a geographical, legal, cultural, and time zone perspective or from a hardware and software acquisition perspective. The test resource goals database 520 stores the resource goals data points at the enterprise, organizations, test environments, test workloads, test cases, test scenarios, test skills, test planners, test architects, testers, business partners, OEMs, and open source foundations along with other related factors and metrics that are resources expenses and also limitations or enablement's associated with business geography, cultural sensitivities and legal obligations, and time zone contradictions.

Next, a decision operation in block 216 decides whether to maintain the resource accounting or to analyze the resource accounting. If it is decided to maintain the resource accounting, an operation in block 220 maintains the resource accounting data to be current and up to date with respect to all physical and human resources, including any changes thereto. If all of the resource accounting data has been maintained, the method 200 may then end in an operation 224.

Instead, if it is decided in the operation in block 216 to analyze the resource accounting data, then an operation in block 228 analyzes the resource accounting data versus the resource allocation goals from the operation in block 212. This operation includes determining, including via historical and run time customer profiling and analytics (e.g., using canned and dynamic analytics), the resource accounting versus the resource allocation goal while scoring and ranking the resource use based on various factors or metrics. To determine if physical and human resource allocation is less than optimal from a return on investment (ROI) perspective, these factors or metrics can include (for example and without limitation): test problems found that may be stored in the database 530 (FIG. 5) per resource cost using data from resources data stores along with test execution workload run facts data that may be stored in the database 540 (FIG. 5); customer detected problems, also known as test escapes, which may be stored in the database 550 (FIG. 5); environment or configuration optimization; workload optimization including functional coverage, stress and activity levels, and/or other workload characteristics' attainment; operational optimization; duplication of test effort within and across test organizations; test plan coverage efficiency; problem and/or critical situation recreate capabilities; and other factors or metrics impacting test resource ROI.

The test defect found data stored in the database 530 uses the test problem record data points as indicative of the success of test and establishes, via warranty cost mitigation value, a return on the resources invested in the test that found the defect.

The workload run facts test environment or configuration, test operator, test workload, test case, and test scenario execution tracking data stored in the database 540 is used to understand the run time resources of each test or groups of tests and tie that data back to the test planning, test architecting, and other related factors and metrics that are resources expenses.

The test defect escape data stored in the database 550 is used to understand the unmitigated warranty cost of testing failure to find defects that impact field product quality (increases over time so dynamic projection is and updated with best available data).

Next, a decision operation in block 232 decides whether or not any ineffective resource utilization is found in the data. If no ineffective resource utilization is found in the data, an operation in block 236 keeps or maintains the current resource utilization goals. The method 200 may then end in the operation in block 224.

Instead, if ineffective resource utilization is found in the data, the an operation in block 240 changes the resource utilization goals to reallocate resources to more productive organizations or environments, or redirect resources to make improvements in test organizations, environments, or improve skills, or quantity of physical or human resources to create greater effectiveness.

An operation in block 244 promotes the new, more effective resource goals at the enterprise, organization, or test environment level so that optimization is realized.

The method 200 may then end in the operation in block 224.

As mentioned, one or more embodiments of the present invention provide for measurement of test resources and coverage efficiency through multiple factors and metrics, using customer profiling and analytics. This solves the problem of how to optimize available test resources and test coverage, in conjunction with numerous and potentially diverse test plans, to potentially encompass all levels of the test organization, including across the enterprise and beyond. This test optimization is achieved through using multiple factors or metrics for test efficiency measurement, driven by customer profiling and its corresponding analytics.

Problem discovery is one of many important or key factors that can determine test workload and test resource efficiency. Embodiments of the present invention expand on methods of test effectiveness measurement through the capability to rank or score test effectiveness based upon a wide and diverse variety of (non-problem discovery related) factors or metrics that are also very important to the customer. Utilizing customer workload profiling ensures that the test workloads, configurations, and resources can be aligned with those of the customer as closely as possible, i.e., through enhanced or significant attainment of customer "likeness."

Also, embodiments of the present invention provide for optimization of test resources and coverage through multiple factor efficiency metrics, using customer profiling and analytics. Given that test resources may span a wide range of pre-GA (General Availability) and post-GA test organizations, environments, skills, geographies, cultures, time zones, priorities, limitations, external companies, business partners, OEMs, Open Source Foundations, and other factors, optimizing these limited and high value test resources is a difficult challenge. Unnecessary duplication of test effort, as well as ineffective test resource utilization, can significantly contribute to product quality issues through lost test opportunities. Where duplication of test effort and ineffective test resource utilization occur, the root cause can often be attributed to not having the appropriate analytical information and visibility to know that these errant test activities are actually occurring. Optimizing allocated or available test resources through effective customer profiling and analytics in accordance with embodiments of the present invention can provide greater test coverage and visibility, resulting in greater product quality.

By coupling the infrastructure of customer profiling visualization and corresponding analytics capabilities with the targeted detailed test plans, a test mission can holistically understand its current test effectiveness and work to achieve greater efficiencies/optimization, through: determining and coordinating which test resources to be best deployed for specific test function, component, and even delineated down to the test case level; where to minimize/eliminate unnecessary duplication of efforts that provide the same coverage; and where to minimize/eliminate test workload re-runs or re-dos. This results in expanded functional test coverage possibilities using these more efficient and de-duplicated existing or available test resources. In addition, utilizing customer profiling to align more closely with customer key workload characteristics helps reduce or eliminate the need for test workload re-runs or re-work.

Further, embodiments of the present invention provide for test resource and coverage optimization information as input for test planning, including financial planning. Given the test resources optimization realized as described above, embodiments provide for valuable insight, intelligence and information on the additional or reduced amount of test resources needed for a specific test plan or mission, providing greater input for current and future test planning financial considerations. By optimizing test resources through effective customer profiling, the test mission may discover modest to significant cost savings.

Given that test workload runs can be complicated, resource and time intensive, limited in availability, and financially expensive to configure, stage, run, and analyze, and can span multiple days or even weeks (including non-user monitored off-shift and weekend time), properly measuring and optimizing the efficiency of the available test resources to provide greater coverage can result in much more cost effective use and financial benefits.

This test resources and coverage efficiency measurement and optimization workload functionality provide multiple capabilities, efficiencies, and financial benefits including: to understand the effectiveness of the workload run (software, hardware, firmware)—as viewed from a variety of perspectives, including problem determination, scalability, performance, stress/load, etc.—and what corrective run time adjustments may be required; to tune test workloads much closer to their intended goal through a wide range of factors or metrics. Intended goals may include emulating key characteristics of a customer workload environment or a test recreate or replication; to significantly reduce the amount of limited and high value System z systems, storage, network, environmental, personnel time and resources to accomplish test objectives, resulting in both financial savings and reduced environmental impact; and to increase test plan efficiency through expanded test coverage, resulting in enhanced product quality and greater customer satisfaction. By the reduction of repeat test workload runs through higher individual workload run effectiveness, the test user/operator can run additional and/or expanded test cases or scenarios, and ensure each workload run maximizes a successful outcome.

Embodiments of the present invention utilize a wide range of efficiency metrics to score or rank test workloads, with this score information stored in a database and coupled with business analytics, to determine which specific workload runs, and specific workload environments can and do provide the best functional and transactional coverage. Customer profiling is fundamental to the process of optimizing the test workloads to be as reflective as possible of customer key workload characteristics, as well as reducing the need for unnecessary test workload re-runs.

Through business analytics, such as for example, analytic modeling and reporting products to perform the analysis, this additional insight and intelligence can be visualized to show different levels of test workload runs and test environment effectiveness, including across a wide range of test resources and organizational denominations, even across the enterprise (and beyond if external testing organizations and/or capacity is used). These denominations include (but are not limited to) the test team, department, organization, product, software stack, pre-GA and post-GA missions, enterprise, external, and overall/comprehensive test mission.

Visualization of existing test resources as well as optimized test resource deployment recommendations, including "what if" scenarios at the various organizational levels, further help the test mission to understand its options and recommended courses of action. The test resources and coverage efficiency and optimization analytics visualization can take many forms, including for example as a map relief with pop-ups and mouse overs showing the individual and overall and comprehensive test resources and coverage and their different efficiencies, as determined, ranked, and scored by a variety of customizable factors.

Included in these business analytics recommendations are the who, where, when, what, how and why to best run test cases or workloads. Using this intelligence, the allocated or available test resources can be optimized for maximum test coverage, including de-duplication of test efforts, and provide empirical resource requirements input for current and/or future test missions. These optimization and deployment recommendations can also be stored in the same database retaining the workload scoring and ranking data.

Test workload effectiveness can be ranked and scored by a variety of adjustable test workload factors or metrics, using scoring and ranking techniques at the overall workload and individual component levels, as well as through other methods. Examples of the factors or metrics that may be used individually and/or in combinations to measure test workload effectiveness include, without limitation: functional coverage; scalability; reliability; availability; serviceability; error recoverability; upgrades and migrations; performance indicators including response times, transaction rates, etc.; benchmarks including by industry, discipline, software, etc.; counters (including minimum/maximum/mean/standard deviation); complexity; product install combinations; environment configurations, including hardware, software, firmware, server, Sysplex, LPAR, Adapter, etc., z/OS, zVM, zLinux, etc., cloud (compute, storage, network); statistical formulas; problem discovery/defect identification; PMR generation; and APAR generation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a processor in communication with one or more types of memory, the processor configured to:
   perform an accounting of available test resources within one or more organizations;
   store data relating to the accounting of available test resources;
   store data relating to one or more test resource goals;
   determine to analyze the data relating to the accounting of available test resources;
   analyze the data relating to the accounting of available test resources with respect to the data relating to one or more test resource goals;
   determine that the available test resources within one or more organizations are either optimal or non-optimal;
   responsive to determining ineffective resource utilization, change the resource utilization goals to reallocate resources to more productive organizations or environments, wherein reallocating resources to more productive organizations or environments comprises providing de-duplication of test efforts; and
   provide a visualization of available test resources and test resource deployment recommendations.

2. The system of claim 1 wherein the available test resources within one or more organizations comprise available test resources across one or more of each of test organizations, test environments and an enterprise.

3. The system of claim 1 wherein the data relating to one or more test resource goals is selected from the group consisting of enterprise, organizations, test environments, test workloads, test cases, test scenarios, test skills, test planners, test architects, testers, business partners, OEMs, open source foundations, other related factors and metrics that are resources expenses, and limitations or enablement's associated with business geography, cultural sensitivities and legal obligations, and time zone contradictions.

4. The system of claim 1 wherein the available test resources comprise human resources and physical resources.

5. The system of claim 1 wherein the processor configured to analyze the data relating to the accounting of available test resources with respect to the data relating to one or more test resource goals comprises the processor configured to determine via historical and run time customer profiling and analytics a score and ranking of use of resources using one or more factors or metrics.

6. The system of claim 5 wherein the one or more factors or metrics is selected from the group consisting of: test problems found per resource cost using data from resources data stores along with test execution workload run facts data; customer detected problems; environment or configuration optimization; workload optimization comprising functional coverage, stress and activity levels, and workload characteristics' attainment; operational optimization; duplication of test effort within and across test organizations; test plan coverage efficiency; problem and/or critical situation recreate capabilities; and factors or metrics impacting test resource return on investment.

7. The system of claim 1, wherein the visualization shows the available test resources and coverage ranked and scored according to a plurality of customizable factors.

8. A computer program product comprising:
   a non-transitory storage medium readable by a processing circuit and storing instructions for execution by the processing circuit for performing a method comprising:
   performing, by a processor, an accounting of available test resources within one or more organizations;
   storing, by the processor, data relating to the accounting of available test resources;
   storing, by the processor, data relating to one or more test resource goals;
   determining, by the processor, to analyze the data relating to the accounting of available test resources;
   analyzing, by the processor, the data relating to the accounting of available test resources with respect to the data relating to one or more test resource goals;
   determining, by the processor, from the analyzing by the processor, the data relating to the accounting of available test resources with respect to the data relating to one or more test resource goals that the available test resources within one or more organizations are either optimal or non-optimal;
   responsive to determining ineffective resource utilization, changing the resource utilization goals to reallocate resources to more productive organizations or environments, wherein reallocating resources to more productive organizations or environments comprises providing de-duplication of test efforts; and
   providing a visualization of available test resources and test resource deployment recommendations.

9. The computer program product of claim 8 wherein the available test resources within one or more organizations comprise available test resources across one or more of each of test organizations, test environments and an enterprise.

10. The computer program product of claim 8 wherein the data relating to one or more test resource goals is selected from the group consisting of enterprise, organizations, test environments, test workloads, test cases, test scenarios, test skills, test planners, test architects, testers, business partners, OEMs, open source foundations, other related factors and metrics that are resources expenses, and limitations or enablement's associated with business geography, cultural sensitivities and legal obligations, and time zone contradictions.

11. The computer program product of claim 8 wherein the available test resources comprise human resources and physical resources.

12. The computer program product of claim 8 wherein analyzing, by the processor, the data relating to the accounting of available test resources with respect to the data relating to one or more test resource goals comprises determining via historical and run time customer profiling and analytics a score and ranking of use of resources using one or more factors or metrics.

13. The computer program product of claim 8, wherein the visualization shows the available test resources and coverage ranked and scored according to a plurality of customizable factors.

\* \* \* \* \*